(12) United States Patent
Shoji et al.

(10) Patent No.: US 7,508,551 B2
(45) Date of Patent: Mar. 24, 2009

(54) IMAGE READING APPARATUS

(75) Inventors: Katsunori Shoji, Tokyo (JP); Osamu Takashima, Tokyo (JP); Junichi Murano, Tokyo (JP); Kazuyoshi Matsumoto, Tokyo (JP); Toshiyuki Uchida, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 1061 days.

(21) Appl. No.: 10/407,335

(22) Filed: Apr. 7, 2003

(65) Prior Publication Data

US 2003/0231364 A1 Dec. 18, 2003

(30) Foreign Application Priority Data

Apr. 17, 2002 (JP) .............................. 2002-115331

(51) Int. Cl.
*H04N 1/04* (2006.01)

(52) U.S. Cl. ................... 358/474; 358/442; 358/496; 358/497

(58) Field of Classification Search ................ 358/468, 358/494, 482, 401, 454, 451, 486, 483, 296, 358/303, 474, 442, 496, 497, 461, 444, 406; 359/668, 710; 382/313; 347/180, 216; 235/462.06, 235/462.1, 455, 462.45
See application file for complete search history.

(56) References Cited

U.S. PATENT DOCUMENTS

| 5,457,516 | A | * | 10/1995 | Kim ............................ 399/37 |
| 5,799,229 | A | | 8/1998 | Yokoyama et al. |
| 5,878,317 | A | | 3/1999 | Masuda et al. |
| 5,895,140 | A | * | 4/1999 | Koh et al. ..................... 399/77 |
| 5,913,095 | A | | 6/1999 | Takashima et al. |
| 5,946,529 | A | | 8/1999 | Sato et al. |
| 6,405,000 | B1 | * | 6/2002 | Nakaya ...................... 399/67 |
| 6,753,984 | B1 | * | 6/2004 | Wada ........................ 358/475 |
| 6,995,877 | B2 | * | 2/2006 | Suzuki ....................... 358/474 |
| 7,006,705 | B2 | * | 2/2006 | Takayama et al. ........... 382/275 |
| 2003/0231364 | A1 | | 12/2003 | Shoji et al. |

FOREIGN PATENT DOCUMENTS

| JP | 9-62064 | 3/1997 |
| JP | 2001-211294 | 8/2001 |

OTHER PUBLICATIONS

U.S. Appl. No. 10/407,335, filed Apr. 7, 2003, Shoji et al.
U.S. Appl. No. 10/743,865, filed Dec. 24, 2003, Matsumoto et al.
U.S. Appl. No. 10/244,466, filed Sep. 17, 2002, Takashima et al.
U.S. Appl. No. 10/231,272, filed Aug. 30, 2002, Murano et al.
U.S. Appl. No. 10/884,979, filed Jul. 7, 2004, Fukuchi et al.
U.S. Appl. No. 10/911,603, filed Aug. 5, 2004, Funamoto et al.
U.S. Appl. No. 10/938,572, filed Sep. 13, 2004, Murano et al.

* cited by examiner

*Primary Examiner*—Houshang Safaipour
(74) *Attorney, Agent, or Firm*—Oblon, Spivak, McClelland, Maier & Neustadt, P.C.

(57) ABSTRACT

An image reading apparatus is equipped with an optical unit. Just prior to shifting to a low power-consumption mode, the optical unit is shifted to a low power-consumption position that is different from a home position.

7 Claims, 2 Drawing Sheets

READING OPERATION STANDBY TIME

DURING LOW POWER CONSUMPTION MODE

IMAGE READING APPARATUS

BACKGROUND OF THE INVENTION

1) Field of the Invention

The present invention relates to an image reading apparatus with improved image reading quality.

2) Description of the Related Art

An image reading apparatus comprises an optical unit that includes a light source for illuminating a paper document, a mirror for directing the reflected light from a paper document illuminated by the light source, a lens for forming an image of the reflected light directed on it, and a pulse motor for driving a scanning unit for reading the image on the document formed by the lens.

Moreover, in the image reading apparatus there is provided a low power-consumption mode and a normal power-consumption mode. In the normal power-consumption mode, power is supplied to almost all the parts of the image reading apparatus. On the other hand, in the low power-consumption mode, power is supplied to only the minimum necessary parts, such as a timer, a counter, and a memory, for a certain period of time.

In the image reading apparatus, there is a home position, which is a position of the optical unit when the optical unit is in a standby state for starting reading of a document, and a low power-consumption position, which is a position of the optical unit when the image reading apparatus is in the low power-consumption mode.

In the conventional image reading apparatus, the start position is the same as the low power-consumption position. As a result, when the image reading apparatus is in the low power-consumption mode, that is when the optical unit is in the low power-consumption position (which is same as the home position), paper dust that accumulates on a glass on which a paper document is kept for reading, tends to fall on the parts of the optical unit to thereby degrade the quality of the image reading. The paper dust accumulates on the glass while the paper is being transferred when performing reading operation. If a paper of poor quality is used then the amount of dust generated increases. Moreover, if the image reading apparatus is installed in an unfavorable environment like dusty place etc., this paper dust or other dust goes inside through small apertures around the glass and gets stuck on the mirror or other components of the optical unit thereby making it apt to generate faulty image having lines.

SUMMARY OF THE INVENTION

It is an object of the present invention to at least solve the problems in the conventional technology.

The image reading apparatus according to one aspect of the present invention comprises an optical unit for reading an image of a document, the optical unit having a home position, which is a position of the optical unit when the optical unit is in a standby state for starting reading of a document, and a low power-consumption position, which is a position of the optical unit when the image reading apparatus is in a low power-consumption mode; and a mechanism that shifts the optical unit to the low power-consumption position, which is different from the home position, just prior to shifting to the low power-consumption mode.

The image reading apparatus according to one aspect of the present invention comprises an optical unit for reading an image of a document; and a mechanism for shifting the optical unit. Just prior to switching the image reading apparatus to a low power-consumption mode, the mechanism shifts the optical unit to a low power-consumption position that is different from a home position.

The other objects, features and advantages of the present invention are specifically set forth in or will become apparent from the following detailed descriptions of the invention when read in conjunction with the accompanying drawings.

DETAILED DESCRIPTION

Figure 1:
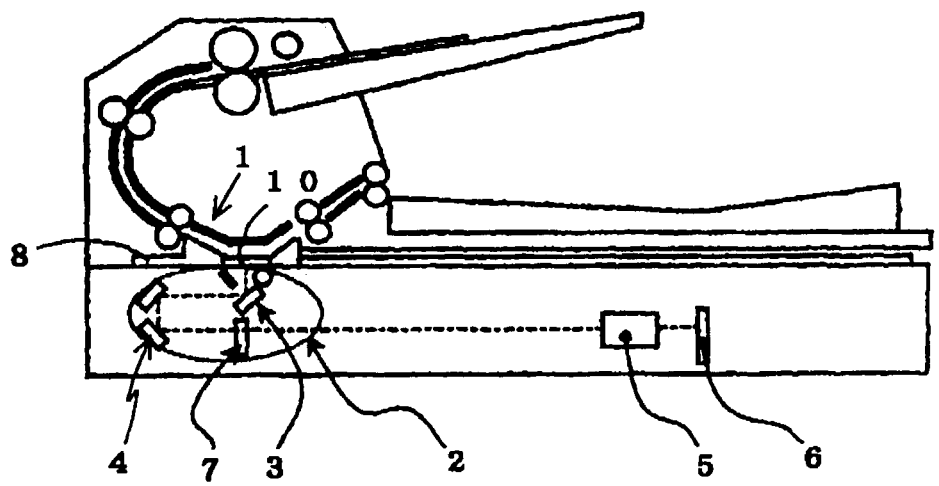
FIG. 1 is a schematic diagram of the image reading apparatus of this invention.

FIG. 1 is a schematic diagram of the image reading apparatus of this invention. This image reading apparatus is provided with a paper document transfer passage 1 and an optical unit 2. This optical unit 2 consists of a first mirror unit 3 that includes a light source and a first mirror supported on both sides, and a second mirror unit 4 that includes a second mirror supported on both sides. The first mirror unit 3 and the second mirror unit 4 are arranged in such a way that they read an image sequentially (one by one) while moving along the paper document with the speed ratio of 2:1 respectively. This movement is in response to a signal, received from a host computer (not shown), that indicates a request for reading one line of an image.

Figure 2:
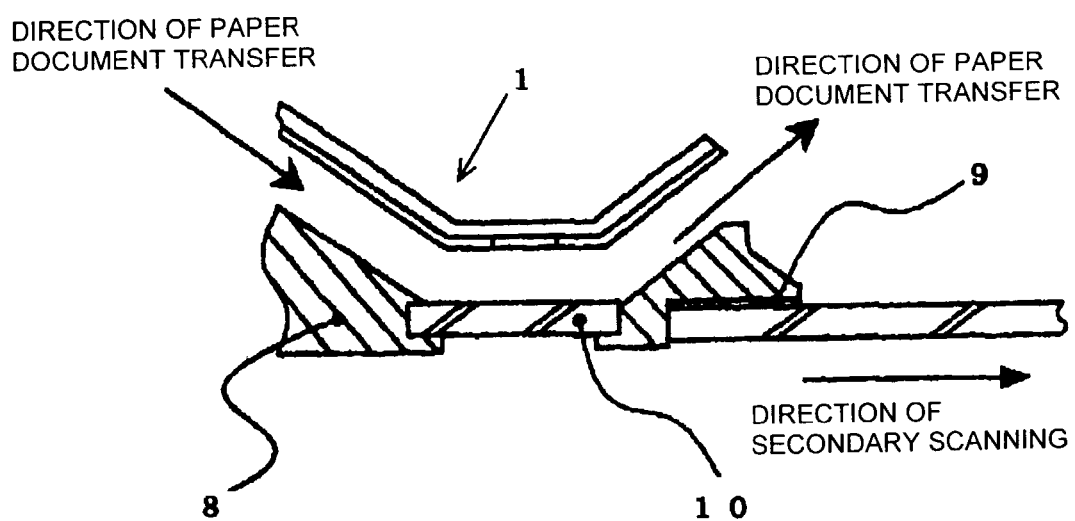
FIG. 2 is an enlarged sectional view of the surrounding area of a glass on which a paper document is kept when performing a reading operation.

FIG. 2 is an enlarged sectional view of the surrounding area of a glass 10 on which a paper document is kept when performing a reading operation. An auto document feeder (ADF) (not shown) picks the document to be read, from a tray or the like, feeds the document on the glass 10, and dispatches the document to the outside, in a tray or the like. When the document is placed on the glass 10, a surface of the paper document, which touches the glass 10, is illuminated by the light source provided in the optical unit 2 and the light reflected from the surface of the paper document is converged by an image forming lens 5 after being directed through the first mirror unit 3, the second mirror unit 4, and a third mirror (not shown) to thereby form an image of one line of the surface of the paper document. The entire surface of paper document is scanned by moving the optical unit 2 in the direction of secondary scanning and direction of primary scanning (not shown). A reading sensor 6, such as a charged coupled device (CCD) etc., converts the image into an electrical signal. The electric signal is forwarded to the host computer.

Figure 3:
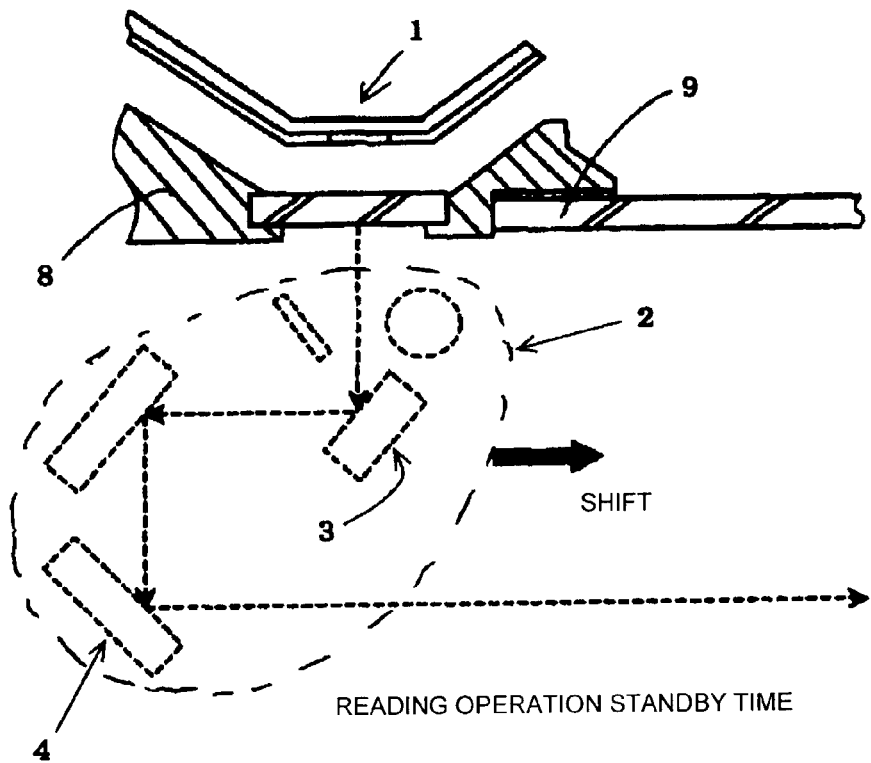
FIG. 3 is a schematic diagram explaining positional relationship of an optical unit and the glass while the image reading apparatus is in a standby state.

FIG. 3 is a schematic diagram explaining the positional relationship between the optical unit 2 and the glass 10 while the image reading apparatus is in the standby state. The optical unit 2 is standing by at a home position for an instruction to start the reading operation. A home position-detecting sensor 7 (refer to FIG. 1) continuously detects whether the optical unit 2 in the home position.

Figure 4:
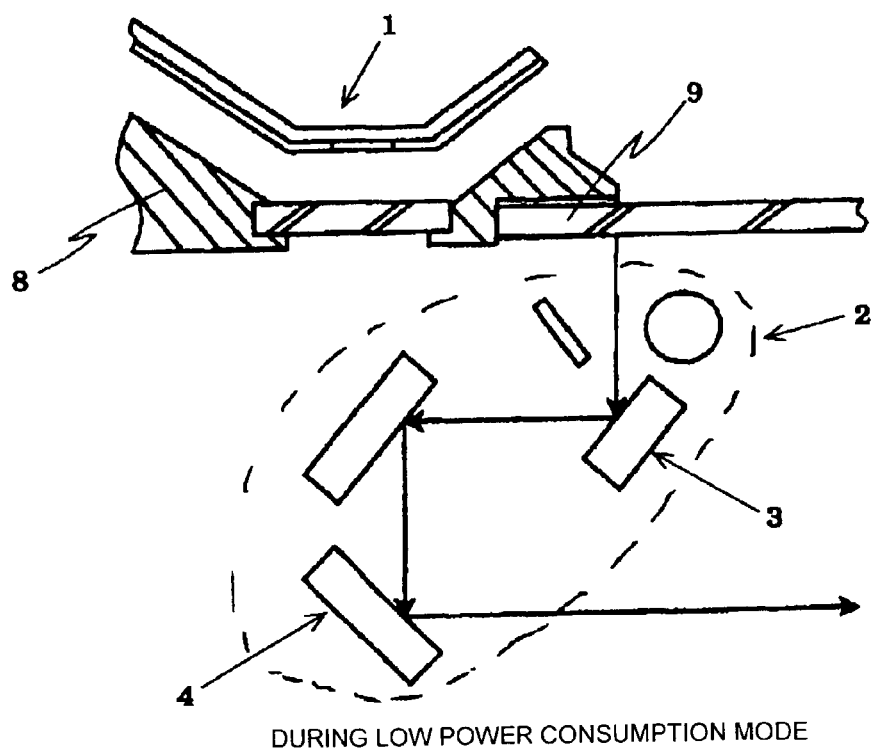
FIG. 4 is a schematic diagram of the optical unit when the image reading apparatus is in a low power-consumption mode.

FIG. 4 is a schematic diagram of the optical unit when the image reading apparatus is in a low power-consumption mode. The low power-consumption mode is a mode in which power is supplied to only the minimum necessary parts, such as a timer, a counter, and a memory, for a certain period of time. On the other hand, a normal power-consumption mode is a mode in which, power is supplied to almost all the parts of the image reading apparatus.

In the conventional image reading apparatus, when returning to the normal power-consumption mode from the low power-consumption mode, it has not been known clearly whether the optical unit 2 is in the home position. Therefore, in the conventional image reading apparatus, it is necessary to perform a reading preparation operation. The reading preparation operation includes a homing operation (reciprocating operation of putting OFF/ON of the home position detecting sensor 7), a shading operation (operation of carrying out image correction control and reading of a white reference plate), and then moving the optical unit 2 and stopping it at the home position.

In other words, in the conventional image reading apparatus, when returning to the normal power-consumption mode from the low power-consumption mode, the reading operation can only be started after completing the reading preparation operation.

As shown in FIG. 4, in the image reading apparatus according to the present invention, the optical unit 2 is moved to a low power-consumption position which is different from the home position just prior to switching over to the low power-consumption mode from the normal power-consumption mode. Since the optical unit is in the low power-consumption position (that is not in the home position) when the image reading apparatus is in the low power-consumption mode, even if dust or the like accumulates on the glass 10, that dust will not fall on the parts of the optical unit 2. As a result the quality of the image reading can be improved.

The low power-consumption position may be a position of the optical unit 2 such that the home position-detecting sensor 7 gets OFF, that is the home position-detecting sensor 7 is not able to detect the optical unit 2. Moreover, the low power-consumption position may be a position of the optical unit 2 such that the optical unit 2 coincides with an edge of the white reference plate.

In the image reading apparatus according to the present invention, in the low power-consumption mode, that is when the optical unit is in the low power-consumption position, the position of the optical unit 2 is not clear because the home position-detecting sensor 7 is OFF. Therefore, in the image reading apparatus according to the present invention, when returning to the normal power-consumption mode from the low power-consumption mode, the reading preparation operation is performed. However, in the image reading apparatus according to the present invention, the homing operation (reciprocating operation of putting OFF/ON of the home position detecting sensor 7) is not required. In other words, the light source is turned on and shading is carried out while the optical unit 2 is returning to the home position. The optical unit 2 is made to stop at the home position, thus completing the preparation for reading, and kept ready for carrying out reading operation.

As explained above, in the invention according to a first aspect of the present invention, when switching to a low power-consumption mode, the optical unit is shifted to a position that is away from the home position. This arrangement prevents the falling of paper dust and other dust from the glass on the parts of the optical unit.

In the invention according to a second aspect of the present invention, the optical unit is shifted to a position at which the home position detector can not detect the optical unit. This arrangement makes it possible to omit the homing operation when the image reading apparatus returns to the normal power-consumption mode from the low power-consumption mode.

In the invention according to a third aspect of the present invention, the optical unit is shifted to a position that coincides with the edge of the white reference plate. This arrangement makes it possible to omit the homing operation when the image reading apparatus returns to the normal power-consumption mode from the low power-consumption mode.

The present document incorporates by reference the entire contents of Japanese priority document, 2002-115331 filed in Japan on Apr. 17, 2002.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An image reading apparatus comprising:
   an optical unit for reading an image of a document, the optical unit having a home position, which is a position of the optical unit when the optical unit is in a standby state for starting reading of a document, and a low power-consumption position, which is a position of the optical unit when the image reading apparatus is in a low power-consumption mode and is a position at which the optical unit coincides with an edge of a white reference plate and a home position detector can not detect the optical unit; and
   a mechanism that shifts the optical unit to the low power-consumption position, which is different from the home position, just prior to shifting to the low power-consumption mode,
   wherein, when the optical unit is returning to the home position from the low power-consumption position, a reading preparation operation is performed, the reading preparation operation including having a light source turned on and having a shading carried out while the optical unit is returning to the home position from the low power-consumption position.

2. The image reading apparatus according to claim 1, further comprising:
   a home position sensor, wherein the sensor continuously detects whether the optical unit is in the home position.

3. The image reading apparatus according to claim 1, wherein in the low-power consumption mode, power is supplied only to one or more of a timer, a counter, and a memory.

4. The image reading apparatus according to claim 1, further comprising:
   a glass, wherein the image of the document is read when the optical unit is at the home position while the document passes on the glass; and
   an auto document feeder configured to pick the document from a first tray, to feed the document on the glass, and dispatches the document to a second tray.

5. An image reading apparatus comprising:
   reading means for reading an image of a document, the reading means having a home position, which is a position of the reading means when the reading means is in a standby state for starting reading of the document, and a low power-consumption position, which is a position of the reading means when the image reading apparatus is in a low power-consumption mode and a position at which the reading means coincides with an edge of a white reference plate and a position at which a home position detector can not detect the reading means; and shifting means for shifting the reading means to the low power-consumption position, which is different from the home position, just prior to shifting to the low power-consumption mode, wherein, when the optical unit is returning to the home position from the low power-consumption position, a reading preparation operation is performed, the reading preparation operation including having a light source turned on and having a shading carried out while the reading means is returning to the home position from the low power-consumption position.

6. An image reading apparatus comprising:

a home position detector that detects whether the optical unit is at home position;

white reference plate;

an optical unit for reading an image of a document; and a mechanism for shifting the optical unit, wherein just prior to switching the image reading apparatus to a low power-consumption mode, the mechanism shifts the optical unit to a low power-consumption position that is different from a home position, the low power consumption position to which the mechanism shifts the optical unit, is a position at which the home position detector is not able to detect the optical unit and a position at which the optical unit coincides with an edge of a white reference plate, wherein, when the optical unit is returning to the home position from the low power-consumption position, a reading preparation operation is performed, the reading preparation operation including having a light source turned on and having a shading carried out while the optical unit is returning to the home position from the low power-consumption position.

7. An image reading apparatus comprising:

reading means for reading an image of a document;

moving means for moving the reading means, wherein just prior to switching the image reading apparatus to a low power-consumption mode, the moving means moves the reading means to a low power-consumption position that is different from a home position; and detecting means for detecting whether the reading means is at home position, wherein the low power consumption position is a position at which the detecting means is not able to detect the reading means and a position at which the reading means coincides with an edge of the reference means, wherein, when the optical unit is returning to the home position from the low power-consumption position, a reading preparation operation is performed, the reading preparation operation including having a light source turned on and having a shading carried out while the reading means is returning to the home position from the low power-consumption position.

* * * * *